March 4, 1930.  T. V. BUCKWALTER  1,748,972
RAILWAY CAR JOURNAL BEARING
Filed Sept. 8, 1928  2 Sheets-Sheet 1

INVENTOR
Tracy V. Buckwalter,
by Carr Han & Gravely,
HIS ATTORNEYS.

March 4, 1930.  T. V. BUCKWALTER  1,748,972
RAILWAY CAR JOURNAL BEARING
Filed Sept. 8, 1928   2 Sheets-Sheet 2
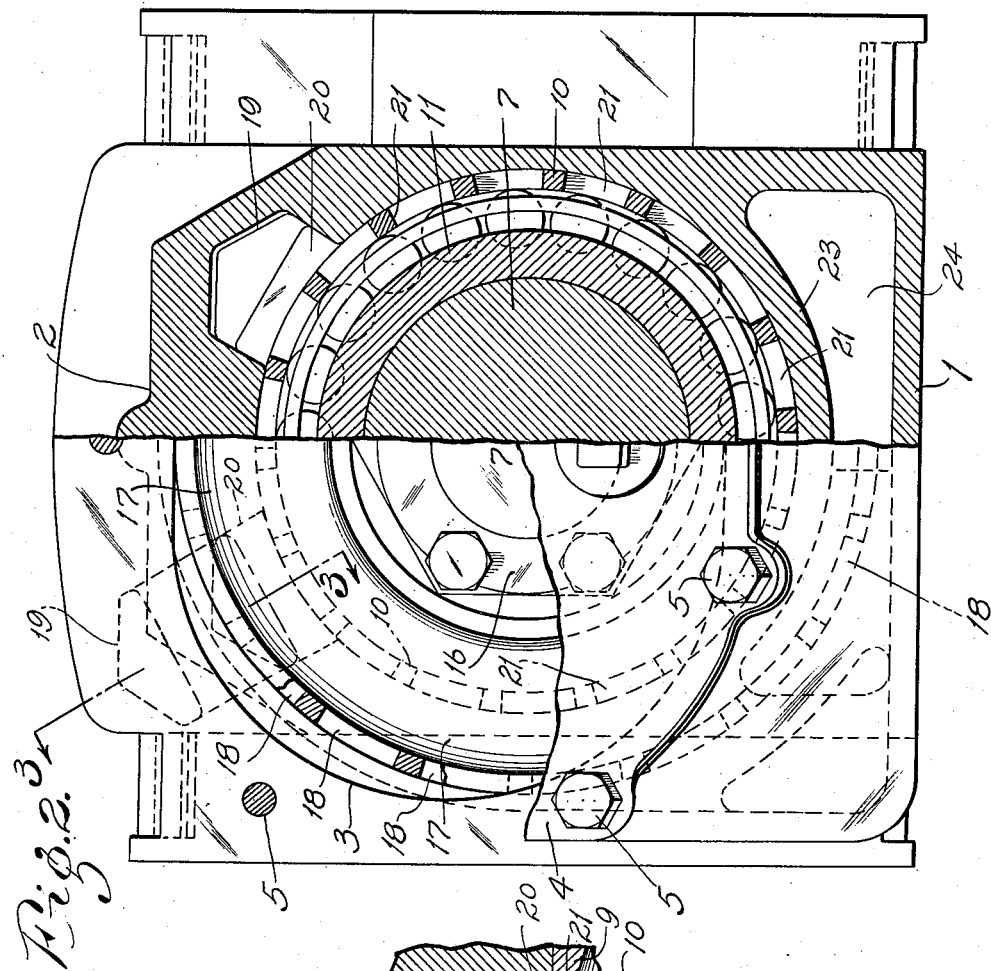
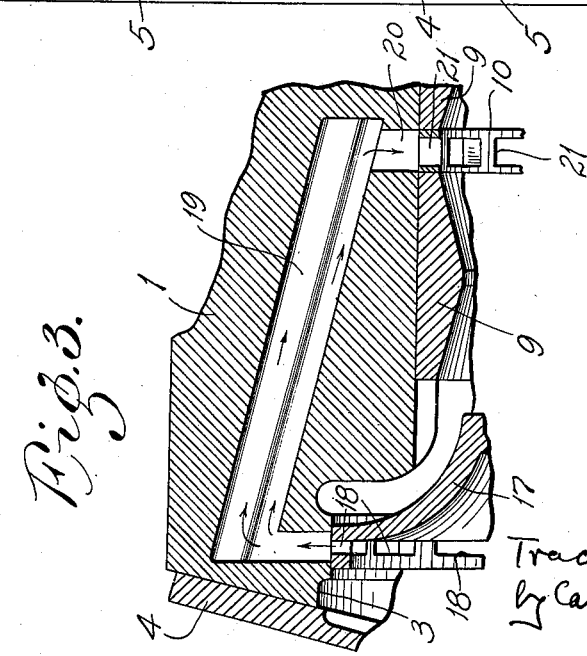
INVENTOR.
Tracy V. Buckwalter,
by Cantlan & Gravely,
HIS ATTORNEYS.

Patented Mar. 4, 1930

1,748,972

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

RAILWAY-CAR-JOURNAL BEARING

Application filed September 8, 1928. Serial No. 304,658.

My invention relates to journal bearing constructions for railway cars and has for its principal object a construction provided with antifriction bearings and provided with positive means for lubricating said bearings. The invention consists principally in providing lubricant passageways through the journal box, permitting flow of lubricant through the bearings and back into the journal box and a propeller wheel on the end of the axle for forcing circulation of lubricant through the bearings when the car is moving. The invention further consists in the railway car journal construction and in the parts and combinations and arrangements of parts hereinafter described and claimed.

In the accompanying drawing, which forms part of this specification and wherein like reference numerals refer to like parts wherever they occur.

Fig. 2 is partly an end elevation and partly a cross-sectional view on the line 2—2 of Fig. 1; and Fig. 3 is a fragmentary view in longitudinal section on the line 3—3 of Fig. 2.

Figure 1:
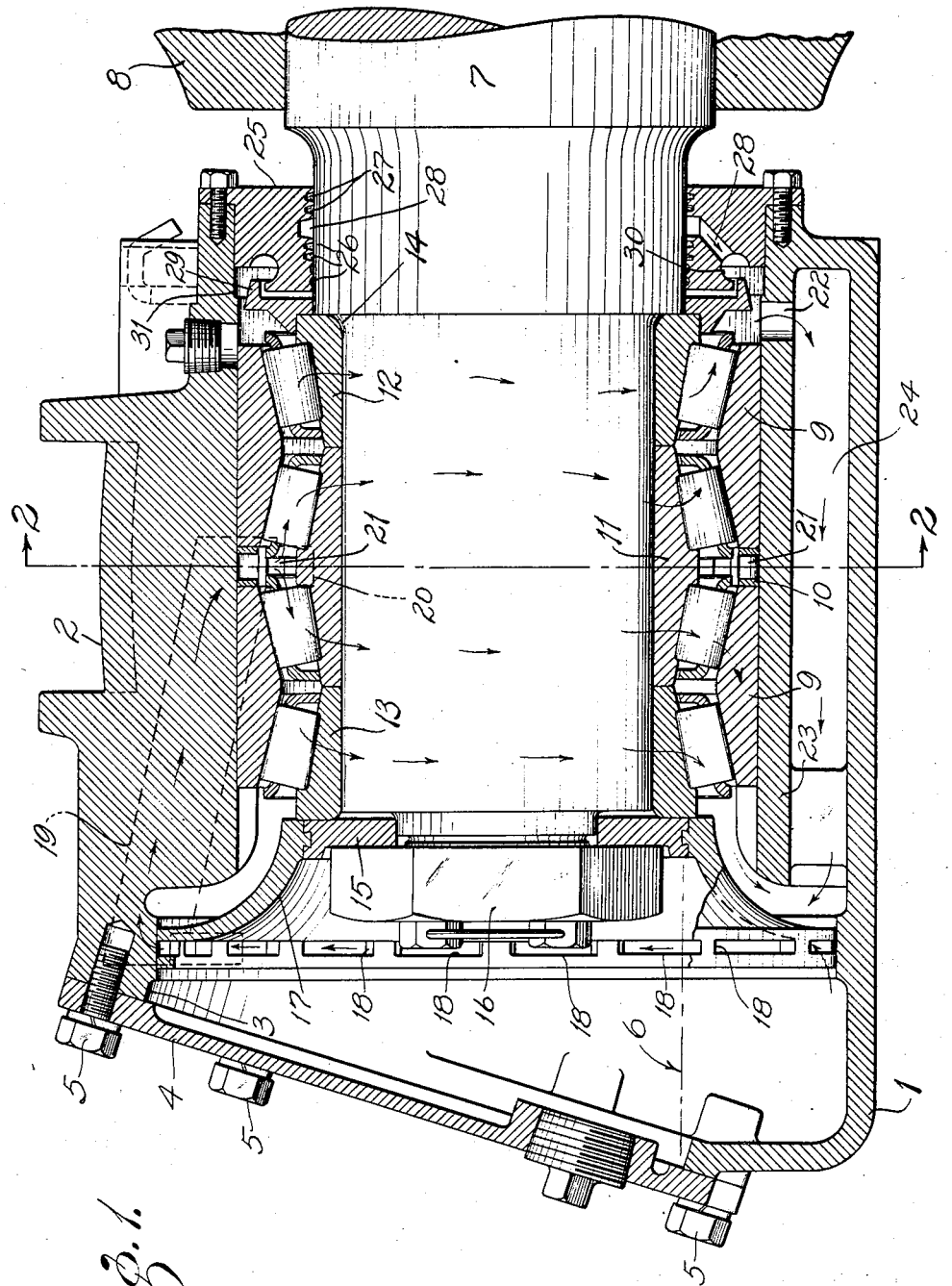
Fig. 1 is a longitudinal section of my device.

The construction illustrated is interchangeable with present A. R. A. standard constructions and includes a journal box 1 having a seat 2 on its top adapted to cooperate with standard truck side frames. The outer end of the journal box has an elliptical opening 3 whose longer axis is horizontal, said opening being closed by a cover plate 4 secured by screws 5. This construction provides a deep lubricant chamber in the housing, the lubricant level 6 being the lowermost portion of the elliptical opening.

The outer end of an axle 7 extends into the journal box and a car wheel 8 is secured to the axle adjacent to the journal box. Interposed between the axle and the journal box are antifriction bearings, preferably tapered roller bearings. In the construction illustrated, the bearing comprises four series of tapered rollers. The two bearing cups 9 or outer bearing members are double cups, each provided with two raceway portions. Said cups 9 are spaced apart by a ring 10. The middle cone 11 is likewise a double member, having two raceways. The innermost cone 12 is a single cone and the outermost cone 13 is likewise a single cone. Said innermost cone abuts against a rounded shoulder 14 formed on the axle and the outermost cone abuts against a ring 15 that is held in place by means of a lock nut 16 threaded onto the end of the axle.

Secured to said ring 15 is an annular member 17 whose outer periphery is formed into a paddle wheel having recesses 18 adapted to carry lubricant from the bottom of the housing and discharge it into longitudinal passageways 19 provided in the top of the journal box near the side margins thereof. Said annular member 17 may be of bronze and may be cast onto said ring 15. Said lubricant passageways 19 slope downwardly toward the middle of the box where they discharge into transverse openings 20. The spacer ring 10 between the bearing cups is provided with openings 21 to permit lubricant to pass therethrough onto the bearings. Lubricant leaving the inner end of the bearings passes through openings 22 in the bearing seat portion 23 at the bottom of the housing into an enlarged longitudinal passageway 24 located beneath said bearing seat portion and the bottom wall of the housing. At the outer or front end of the bearings, lubricant can flow from the end of said bearing seat into the lubricant passageway and into the bottom of the housing.

At the inner end of the journal box is a closure ring 25 that is provided with oil retaining grooves 26 and dust excluding grooves 27 and also with a transverse passageway 28 to return to the journal box any lubricant that may work past the oil retaining grooves 36. Mounted at the end of the innermost bearing cone is a ring 29 that overlaps an annular groove 30 formed in said closure ring. Said ring tends to throw against the box any lubricant that may be caught thereby and the box is provided with an annular groove 31 to catch such lubricant. Said annular groove 31 and the groove 30 in said closure ring carry to the bottom of the box any lubricant that may be caught therein.

The above described construction provides an antifriction bearing construction that is interchangeable with present plain bearing constructions. It provides a simple and effective means for lubricating such antifriction bearings. It firmly holds the bearings in position and maintains the adjustment thereof. The horizontal axis of the elliptical opening is large enough to permit the insertion of the wheel for mounting on the end of the axle. Shortening the vertical axis raises the bottom level of the opening so as to provide a deeper lubricant storage chamber. The bearings may be mounted in the journal box and the assembly placed on the axle, after which the impeller wheel and lock nut may be put in place.

Obviously numerous changes may be made without departing from the invention and I do not wish to be limited to the precise construction shown.

What I claim is:

1. A railway car journal bearing construction comprising a journal box having a lubricant chamber, an axle extending into said journal box, antifriction bearings interposed between said axle and said journal box and a lubricant impelling wheel secured to the end of said axle, said bearings including two double bearing cups and a perforated spacer ring therebetween, said journal box having longitudinal passageways in its upper portion inclined downwardly from the outer end toward the middle and opening into the interior of the journal box at said perforated ring to permit lubricant to reach said bearings and said journal box also having a passageway to return lubricant from the bearings to the lubricant chamber.

2. A railway car journal bearing construction comprising a journal box having an elliptical opening in its front end, the longer axis of said elliptical opening being horizontal, whereby the bottom of said opening is above the bottom of the journal box to create a storage chamber for said lubricant in the bottom of said journal box, an axle extending into said journal box, antifriction bearings interposed between said axle and said journal box, said bearings including a single bearing cone abutting against a shoulder provided therefor on the axle, a double bearing cone, a single bearing cone at the outer end of the axle and double bearing cups having a perforated spacer sleeve therebetween, an impeller wheel mounted on the end of said axle and dipping into the lubricant chamber, said impeller wheel having a body portion engaging the outermost bearing cone and a lock nut on the end of said axle engaging said body portion to hold said impeller wheel and said bearings in position, said journal box being provided with lubricant passageways, whereby lubricant picked up by said wheel is distributed to the upper portion of the bearings and after circulating through said bearings is returned to the lubricant storage chamber.

Signed at Canton, Ohio, this 5th day of Sept., 1928.

TRACY V. BUCKWALTER.